Jan. 10, 1961 A. CAHA ET AL 2,967,939
GAMMAGRAPH FOR MEDICAL PURPOSES
Filed May 12, 1958
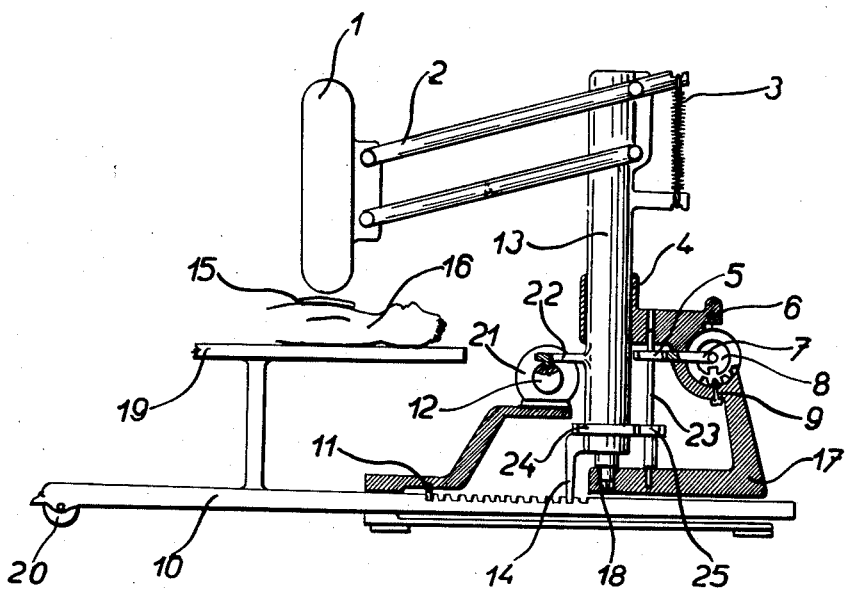
INVENTORS
Archimiro Caha and
Kamil Kallusch
BY
Michael S. Striker
Attorney

2,967,939
GAMMAGRAPH FOR MEDICAL PURPOSES

Archimiro Caha, 15 Krizova, and Kamil Kallusch, 60 Dukelska, both of Brno, Czechoslovakia
Filed May 12, 1958, Ser. No. 734,621
Claim priority, application Czechoslovakia May 13, 1957
4 Claims. (Cl. 250—83.3)

The present invention relates to a device for investigating the condition of the human body by means of gamma radiation and its object is to provide a device of this kind, which would render quick and reliable results.

In modern diagnostical methods, artificial radioactive material is more and more used for determining certain diseases. This material is administered to the human organism in form of radioactive compounds, by means of which metabolism is studied or the specific absorption in different tissues is determined. In addition, also pure isotopes are applied in the organism as $I^{131}$, $Au^{198}$, $P^{32}$, $Cs^{137}$, $Co^{60}$, which serve for diagnostic and for medical purposes.

Papers have been presented, describing methods and possibilities to locate brain tumors by means of diiodofluorescein and there are also references about determining the presence of metastases of tumors of lymphatic ganglia and in bones by means of artificial radioactive material. $I^{131}$ is used for instance in small quantities ($\mu C$) for determining the function of the thyroid glands, in larger quantities for therapeutic application. As to the selective absorption in tissues, there are still disputes concerning the absorption in tumors and in inflammated tissues. It is however possible to state, that at present the isotopes are commonly used for determining the function of the thyroid gland and to determine brain tumors. Some authors use isotopes for proving the presence of metastatic tumors in lymphatic ganglia. In gynaecology $Au^{198}$ is in recent time used, which is applicated within the abdominal cavity, in urology $Co^{60}$ and $Cs^{137}$ is used. All mentioned diagnostic and healing methods require besides an exact dosing the possibility of a two dimensional, sometimes of a three dimensional localisation in the organism contributing thus to the correct local dosing and to an improvement of the results of medical treatment.

The localisation of isotopes in the organism is carried out mainly by means of Geiger-Mueller counters which are arranged within a correspondingly efficient protective Pb case. The G.M. tube in the protective case is moved above the investigated patient or above the organ by means of a mechanical or automatical scanning device. In recent times the G.M. tube has been to a large extent replaced by the so called scintillation counters. The scintillation counter consist of a scintillation head, containing a crystal of NaI (Tl) and a photomultiplier. The said parts are contained in a protective Pb case with a directional detection. The scintillation head is placed in a mechanic or automatic scanning device. An electronic part comprising a source of high voltage current, an amplifier, discriminator and reductor is connected to the G.M. tube or to the scintillation head. A recording device, recording the individual impulses is connected to the reductor. The record is called scintillogram. If for inst. a gamma photon emitted from $I^{131}$ reacts upon the uncovered part of the crystal located in the scintillation head, scintillations are originating in the crystal, which are transformed by the photomultiplier into current impulses. These impulses are transformed by means of the electronic device to records. In the following only the mechanical arrangement of such a gammagraph will be described.

In present devices the record is obtained either by mechanical means or by light impulses directed to photographic paper or roentgen film, where already the picture of the respective part of the human body has been exposed, for which part the scintillogram should be taken.

The scintillogram taken by means of light signals is not always advantageous, as the film must be first developed and if we require duplicates, the film must be correspondingly treated. All traces of the scintillogram gained by light signals are not clearly visible on the film, namely where the light flash strikes a place of the film, which has been already substantially exposed by roentgen radiation. For records using the burning method we have to count with a further increase of the electronic part of the device.

The G.M. tube or the scintillation head of presently used apparatus is moved in a straight line in a horizontal plane above the investigated body or organ. Thus the record of the respective organ, namely of parts located close below the skin, is obtained from different distances, so that the geometric proportions are considerably distorted (for inst. the thyroid gland).

The constructive arrangement of the scanning device is rather complicated and uses two electric driving motors making considerable noise. This noise is for patients with sore thyroid glands very inconvenient. The recording plane is about 12 to 16 inches, arranged above the patient's head and obstructs his view. The length of the scanning lines is also adjustable only in several stages.

The gammagraph for medical purposes according to this invention is by way of example shown schematically on the accompanying drawing.

The device described has a frame 17, supporting a vertical pole 13 by a vertical guiding bearing 4 and a thrust bearing 18 enabling an angular movement of said pole around its vertical axis. Said pole 13 supports by means of two substantially parallel pivoting links 2 a scintillation head 1, said links forming with parts of said pole 13 and parts of said scintillation head 1 a parallelogram, maintaining always the vertical position of said scintillation head, allowing however the head to be raised or lowered at will. The upper of said links 2 is extended beyond its pivoting axis on the pole 13 with a spring 3 acting on this extended part, said spring 3 balancing a substantial part of the weight of the scintillation head 1. A table 19 for the patient to be investigated is provided, having an extension 10 engaging into the frame 17 and resting on supporting rollers 20, said extensions 10 allowing a sliding movement of said table 19 with respect to said frame 17. The pole 13 is provided with an extension 22 engaging with a link 12 receiving from an electric motor 21 over a gearing a reciprocating movement. This drive transmitting to the pole 13 a reciprocating angular movement may be accomplished by any method known to those skilled in the art. The said link 12 may be for instance a disc with a circumferential groove, into which a pin, attached to the extension 22 of the pole 13 engages. This disc may be adjusted as to its angular position with respect to the axis of the motor 21. If it is perpendicular to said axis, the pole 13 remains still and does not perform any angular movement. The more the position of the disc differs from said perpendicular position, the larger are the angular deviations of the pole 13. The extension 10 of the table 19 engaging into the frame 17 is provided with an indentment and adjustable catches 14 are attached to the pole 13, said catches engaging into said indentment and causing in the extreme position of the pole a shifting of the table 19 for one tooth nearer to the axis of the pole 13. A further catch 11 cares for the maintenance of the table 19 in its position during the scanning movement.

The recording drum 8 where the results of the scanning movement of the scintillation head are recorded is composed of two parts, the inner stable part, supported by bearings in the frame 17, on which a hollow cylinder may perform a translating and a rotating movement. The translating movement of this cylinder is derived from the reciprocating angular movement of the pole 13. Parallel to the pole there is a vertical shaft 23 supported by the frame 17, the pole 13 and the shaft 23 provided with toothed wheels 24 and 25 respectively meshing with each other, said shaft 23 provided with another toothed wheel 5 engaging into a cam shaft 7 guided in a horizontal sliding bearing of the frame 17 parallel to the axis of the drum 8. Extensions of said cam shaft 7 are engaging with the hollow cylinder 8, transmitting to it the translating movement in the direction of the axis of the cylinder 8. The rotating movement of the hollow cylinder 8 is derived from this translating movement in that the stable part of the drum 8 is provided with a longitudinal groove of a shape corresponding to the movements of the scintillation head 1. The hollow cylinder on said drum 8 has a bolt, engaging into said groove, so that the hollow cylinder must perform simultaneously with the translating movement an angular movement, copying thus the movements of the scintillation head. The hollow cylinder 8 is in addition provided with circumferential indentments on both ends with a pitch corresponding to the pitch of the indentment on extensions 10 of the table 19. This indentment engages with a bolt 9 on the frame 17, causing in each extreme position of the hollow cylinder its advance for one tooth together with the inner part of the drum. Thus a true copy of the movement of the scintillation head 1 is achieved on the hollow cylinder provided with recording paper, on which the record is made by a recording pin 6 operated electromagnetically.

When using this device, the scintillation head 1, the major part of the weight of which is balanced, is applied to the place of the body 16, which ought to be investigated. To prevent any damage of the skin, it is advisable to put on the investigated place a foil 15 of suitable plastic material, which, when softened for instance in hot water, may be shaped so as to completely take over the shape of the corresponding place of the body, so that the scintillation head may come directly in contact with the skin and follow closely the shape of the investigated place, so that the distance between the scintillation head and the surface of the skin remains constant. Thus more accurate measurements may be achieved than at present, when the scintillation head has been moved in a horizontal plane.

Due to the adjustability of the link 12, the angular deviation of the pole 13 may be adjusted to the required value, so that the time required for scanning may be reduced to a minimum. If for instance a scintillogram of the thyroid gland has to be taken, the scintillation head does not need to follow the full deviation, but only within the range of about 2¾ inches. It scans thereafter the investigated place along sections of a circle and after each completed line, the relative position of the investigated body and the scintillating head is shifted so, that the following line is parallel to the preceding and of the same length.

The described device removes thus substantially the drawbacks of presently used systems, the design is much simpler, its dimensions and weight are reduced, and only one electric motor is required, which may be located below the investigated person, so that the disturbing effect of the noise is reduced, the scintillation head may follow closely the shape of the investigated part of the body, the record is obtained on a recording drum, arranged beyond the view of the patient and the scintillogram or its copy may be analysed directly without further treatment. The time required for preparing a scintillogram is considerably reduced, as we may adjust easily both the length of the parallel circular lines and the number of lines, required for the given purpose.

What we claim is:

1. In a radiation detecting scanning device, in combination, a support for the object the radiation of which is to be scanned; carrier means for carrying a radiation sensitive device, said support means and said carrier means being movable relative to each other in a predetermined direction; means for actuating reciprocating movement of said carrier means in a direction transverse of said predetermined direction; means for moving said support means and said carrier means relative to each other in said predetermined direction; recording means; and means operatively connected to said support means and said carrier means for moving said recording means in coordination with the relative movement of said support and of said carrier means.

2. In a radiation detecting scanning device, in combination, a support for the object the radiation of which is to be scanned; carrier means for carrying a radiation sensitive device, one of said support means and said carrier means being movable relative to the other in a predetermined linear path; means for actuating reciprocating arcuate movement of said carrier means in a direction transverse of said predetermined linear path; means for moving one of said support means and said carrier means relative to the other in said predetermined linear path; recording means; and means operatively connected to said support means and said carrier means for moving said recording means in coordination with the relative movement of said support and of said carrier means.

3. In a radiation detecting scanning device, in combination, a frame structure; a support for an object the radiation of which is to be scanned; means for moving said support relative to said frame structure in a predetermined linear path; carrier means for carrying a radiation sensitive device pivotally mounted on said frame structure; means for actuating reciprocating pivotal movement of said carrier means; means for moving said support relative to said frame structure in said predetermined path; recording means; and means operatively connected to said support means and said carrier means for moving said recording means in coordination with the relative movement of said support and of said carrier means.

4. In a radiation detecting scanning device, in combination, a frame structure; a support for an object the radiation of which is to be scanned; means for moving said support relative to said frame structure in a predetermined linear path; carrier means for carrying a radiation sensitive device pivotally mounted on said frame structure; means for actuating reciprocating pivotal movement of said carrier means; means for moving said support relative to said frame structure in said predetermined path; a recording cylinder and recording stylus means mounted on said frame for relative rotary and axially translatory movement; and means operatively connected to said support means and said carrier means for rotating said recording cylinder and said recording stylus means relative to each other in coordination with the movement of said support relative to said frame structure in said predetermined path, and for axially moving said recording cylinder and said recording stylus means relative to each other in coordination with said pivotal movement of said carrier means.

References Cited in the file of this patent

UNITED STATES PATENTS

| 2,526,326 | Callahan et al. | Oct. 17, 1950 |
| 2,617,945 | Lord et al. | Nov. 11, 1952 |
| 2,640,159 | Gerneth | May 26, 1953 |
| 2,781,454 | Green et al. | Feb. 12, 1957 |

FOREIGN PATENTS

| 483,292 | France | Mar. 26, 1917 |